(Model.)

A. G. BURTON.
SAFE LOCK.

No. 553,051.   Patented Jan. 14, 1896.

Witnesses
Wm. J. Heming
Louis M. Whitehead

Inventor
Augustus G. Burton
by Dayton, Poole & Brown
Attorneys.

(Model.)

A. G. BURTON.
SAFE LOCK.

No. 553,051.

Patented Jan. 14, 1896.

Witnesses
Wm. F. Henning.
Louis M. F. Whitehead.

Inventor
Augustus G. Burton
by Dayton, Poole & Brown
Attorneys.

(Model.)

A. G. BURTON.
SAFE LOCK.

No. 553,051. Patented Jan. 14, 1896.

Witnesses
Wm. F. Hening
Louis M. F. Whitehead

Inventor
Augustus G. Burton
by Dayton, Poole & Brown
Attorneys (Model.)

A. G. BURTON.
SAFE LOCK.

Patented Jan. 14, 1896.

Witnesses
Wm. F. Henning
Louis M. F. Whitehead

Inventor
Augustus G. Burton
by Dayton, Poole & Brown
Attorneys.

(Model.)

A. G. BURTON.
SAFE LOCK.

Patented Jan. 14, 1896.

Witnesses
Wm. F. Henning
Louis M. F. Whitehead

Inventor
Augustus G. Burton
by Dayton, Poole & Brown
Attorneys.

UNITED STATES PATENT OFFICE.

AUGUSTUS G. BURTON, OF CHICAGO, ILLINOIS.

SAFE-LOCK.

SPECIFICATION forming part of Letters Patent No. 553,051, dated January 14, 1896.

Application filed September 2, 1889. Serial No. 322,760. (Model.)

*To all whom it may concern:*

Be it known that I, AUGUSTUS G. BURTON, of Chicago, in the county of Cook and State of Illinois, have invented certain new and useful Improvements in Safe-Locks; and I do hereby declare that the following is a full, clear, and exact description thereof, reference being had to the accompanying drawings, and to the letters of reference marked thereon, which form a part of this specification.

This invention relates to improvements in bolt-actuating devices for safes and vaults of that class known as "automatics" or those in which the lock-bolts are cast and retracted, and locking and unlocking the safe by means of springs or weights located inside of the safe or vault, whereby the bolts are actuated without the employment of any spindle passing through the door or other part of the safe and without any aperture in the door or walls of the safe or vault.

The invention embraces improvements in mechanism by which the bolts are cast or retracted of the same general character as that shown in Letters Patent No. 383,041, granted to me May 15, 1888, and also an improved controlling device for retarding the movement of the bolts under the action of the springs of the bolt-actuating mechanism, and a novel safety unlocking device for tripping the bolt-actuating mechanism in case of accident to the time mechanism.

The invention consists in the matters hereinafter described, and pointed out in the appended claims.

In the accompanying drawings, illustrating my invention.

In the said drawings, A indicates a safe-door which is provided with the usual vertical and horizontal bars or frame-pieces A' A', which are permanently affixed to the inner face of the door and afford bearings for the bolts, which are indicated at B B B.

B' B' are vertical carrier-bars which are attached to the horizontal bolts B B and serve to communicate motion to said bolts from the actuating mechanism. The carrier-bar B' adjacent to the outer edge of the door is immediately connected with or actuated by the bolt-actuating devices, while the carrier-bar at the opposite or hinge side of the door is actuated from the other carrier-bar through the medium of the horizontal connecting-bar B², which is connected at one end with the outer carrier-bar and at its other end with one end of a vertically-arranged lever B³ which is pivoted between its ends to the door and united by a slot-and-pin connection with the inner carrier-bar in a manner common and well known. The vertical bolts B B, or those at the top and bottom of the door, are actuated by bell-crank levers B⁴ B⁴ from adjacent horizontal bolts, in a well-known manner.

Figure 1:
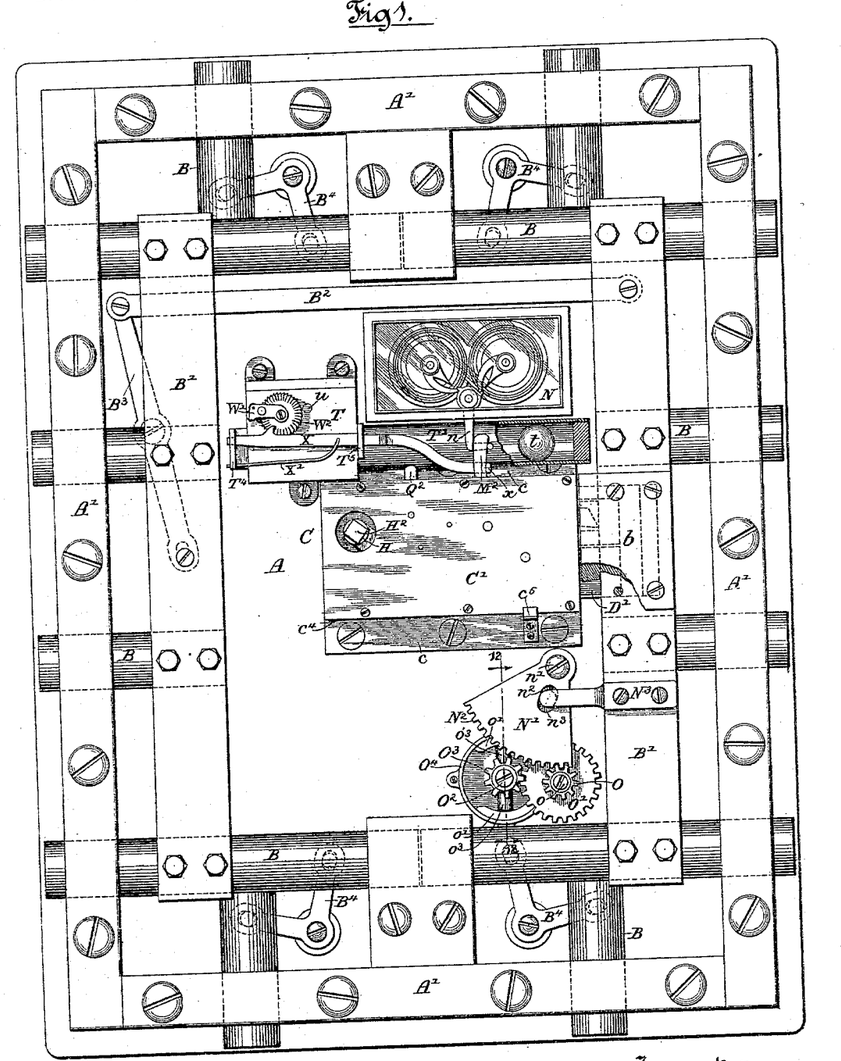
Fig. 1 is a view in elevation of the inner side of a safe-door, showing the bolt-work, a bolt-actuating mechanism, a retarding device, and a safety unlocking device.

C indicates a metal box or case which incloses the springs or other main parts of the bolt-actuating mechanism, and C' a second case, which is located over or against the inner face of the case C, and which contains the locking-motor. The case C' is herein shown as made of the same size as the main part of the case C, so that it conceals all the latter except the attaching flanges c c thereof, when viewed from the inside of the door, as shown in Fig. 1. Said case C' is clearly shown in section in Figs. 5 and 6 and in inside elevation in Fig. 3.

D is a sliding plate or casting located within the case C, and provided with integral parallel parts or bars D' D² which pass through the end wall of the case adjacent to the outer carrier-bar B', and are provided at their ends with a cross-bar D³ which engages said carrier-bar. The cross-bar D³ is connected with the carrier-bar B' by means of a transverse flange or head $d$ upon the cross-bar which is engaged with an L-shaped plate $b$ bolted to the outer face of the carrier-bar and having its inwardly-bent end engaged with the inner face of the flange $d$, in the manner clearly shown in the drawings, Figs. 1, 5 and 6.

E is another sliding plate or casting which is located within the case C between the parallel parts or bars D' D² of the plate D. Said plate E passes through an opening in the end of the case C adjacent to the carrier-bar and is adapted to act against the plate $b$ in such manner as to throw outwardly the carrier-bar and thereby cast the bolts when said plate E is thrust outwardly from the case.

F F are springs interposed between the end wall $c'$ of the case adjacent to the carrier-bar and the inner end of the sliding plate D and operating to carry or thrust said plate inwardly. Said springs F F operate to retract the bolts and operate upon the latter through the medium of the plate D, the bars D' D², the plate $b$, and the carrier-bar.

G G are other springs for casting the bolts, said springs being located between a suitable abutting surface at the inner end of the plate D and the sliding plate E. Said springs operate by their expansion to thrust the said plate E outwardly and thereby move the bolts into position to engage the bolt-apertures of the jamb.

Figure 11:
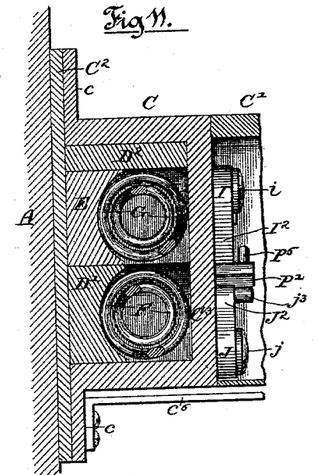
Fig. 11 is a detail section of the main case of the bolt-actuating device, taken upon line 11 11 of Fig. 2.

For economy of space and compactness of construction the springs F and G are arranged side by side in the same vertical plane, and the bar D' of the sliding plate D is longitudinally hollowed or recessed upon its surface adjacent to the spring F to receive the latter, while the sliding plate E is similarly hollowed to receive the spring G, as clearly shown in Fig. 11.

Figure 6:
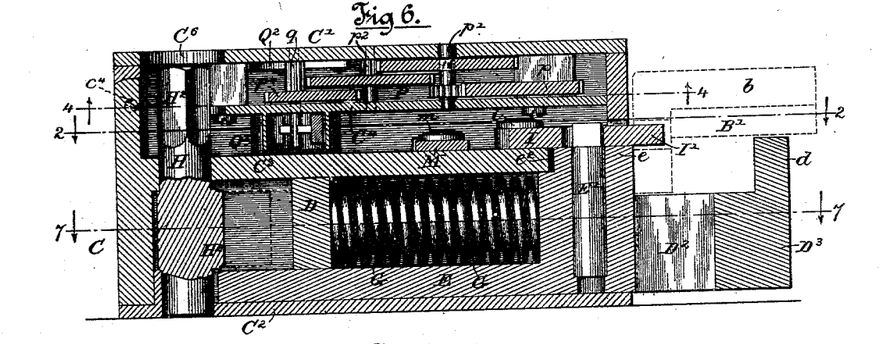
Fig. 6 is a similar section taken upon line 6 6 of Fig. 2.
Figure 7:
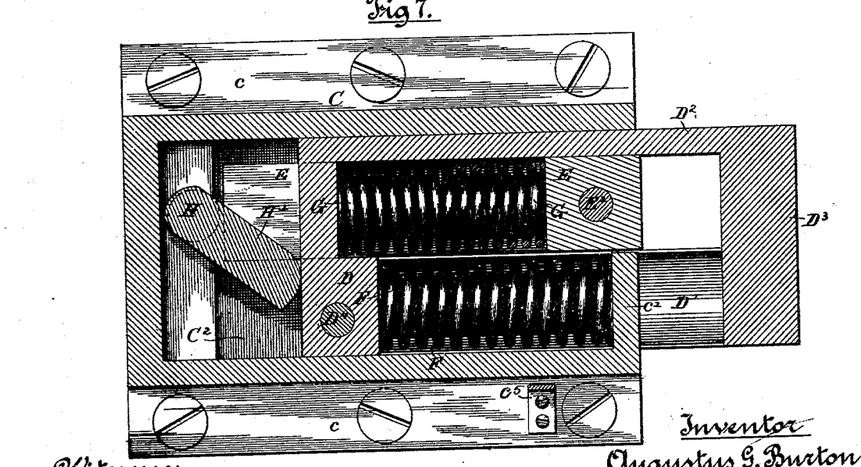
Fig. 7 is a sectional view of the main case of the bolt-actuating mechanism, showing the actuating-springs, and taken upon line 7 7 of Figs. 5 and 6.
Figure 8:
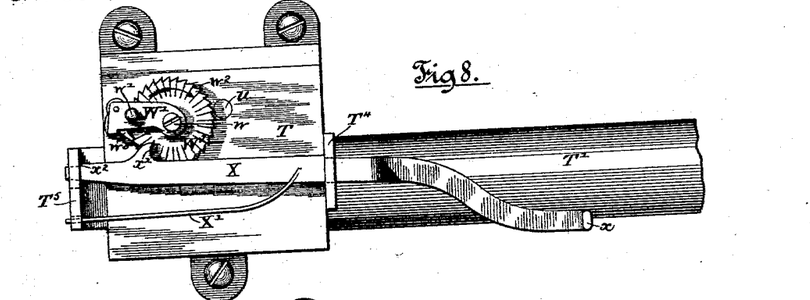
Fig. 8 is a detail face view of the unlocking mechanism.
Figure 9:
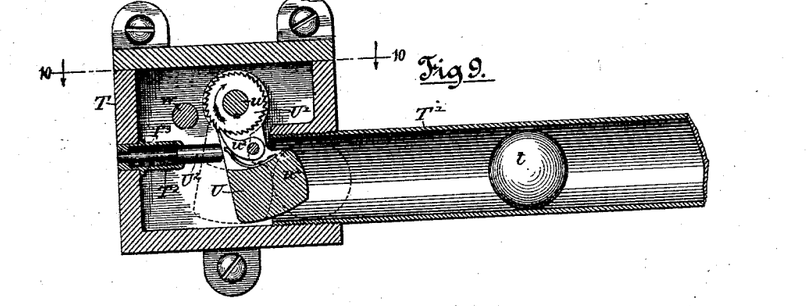
Fig. 9 is a sectional view of the same, taken upon line 9 9 of Fig. 10.
Figure 10:
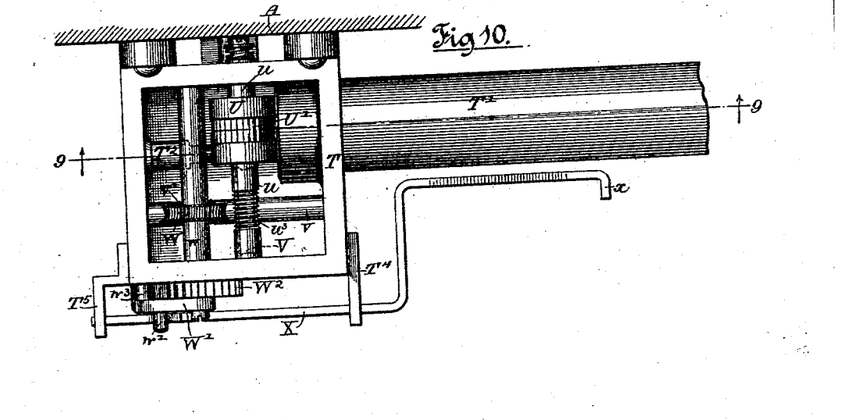
Fig. 10 is a horizontal section of the same, taken upon line 10 10 of Fig. 9.

H is a heavy shaft having bearings at its inner and outer ends, respectively, in the inner wall C² and outer wall C³ of the case C, Fig. 6. Said shaft is provided inside of the case with a strong arm or wing H', the outer or free end of which is adapted to bear against the rear or inner surface of the sliding plate D when said shaft H is turned upon its axis. Said shaft H is further provided with a squared head H², Fig. 6, upon its end outside of the case C, whereby a hand-lever or wrench may be engaged with the shaft for the purpose of turning the same. When the sliding plate D is at the rearward or inward limit of its movement and the springs F and G are expanded the arm H' of the shaft H will be thrown back against the rear or end wall of the case, while said plate D rests in contact with or adjacent to the side face of the said wing or arm. The purpose of the said shaft and arm or wing thereon is to compress the casting and retracting springs F and G preparatory to locking the door, and such compression of the springs is accomplished by turning the shaft H about its axis so as to carry the free end of the arm outwardly or forwardly and thereby press or force the sliding plate D forward.

The sliding plate E is held from forward movement at the time the spring G is compressed by devices shown more clearly in Figs. 2 and 6, and which are constructed as follows:

E' is a rigid stud affixed in the front or outer face of the plate E and arranged to extend above the outer face of the wall C³ of the case C. As herein shown, Figs. 2 and 6, the plate E is provided with an outwardly-extending projection $e$, which is flush with the outer face of the said wall C³ and enters a notch $e^2$ in said wall when the plate E is retracted.

I is a detent which is pivoted by means of a stud $i$ to the wall C³ of the case C. Said detent is provided with an arm I' having a notch or shoulder $i'$, adapted to engage the stud E' when the plate E is retracted. The said detent I is also provided with an arm I². herein shown as arranged at right angles to the arm I', said arm I² being adapted for engagement at its free end with a locking detent J. Said locking detent J is pivoted upon a stud $j$ affixed in the wall C³ and is provided with an arm J' having a notch $j'$ which engages said arm I² of the detent I in such manner as to hold the detent-arm I' engaged with the stud E'. The engaging-surfaces of the stud E' and the detent-arm I' are slightly beveled or inclined so that the pressure of the stud against the detent will tend to disengage said parts. The said arm J' is shown as extended past the notch $j'$ and as provided at its end with a lateral projection $j^2$ adapted to engage the arm I² and to thereby limit the movement of the same and of the detent I when the latter is moved to release the sliding plate E.

The detent I is provided inside of and adjacent to the shoulder $i'$ with an inclined or cam-surface $i^2$, which is adapted to be engaged by the rear or inner surface of the stud E' as the latter is moved backwardly past the detent-arm I'. Said cam-surface is so shaped that the contact of the stud therewith will rotate the said detent I about its pivot in a direction to carry the shoulder $i'$ across or into the path of the said stud, and said cam-surface $i^2$ is so located that the stud reaches a point inside of and free from the shoulder $i'$ before the outer end of the arm I' is swung across the path of the stud. It follows from the construction described that when the sliding plate is thrown backwardly in retracting the bolts for unlocking the safe, the contact of the said stud E' with the cam-surface $i^2$ operates to accomplish automatically the engagement of the detent with the stud. A detent provided with an arm or surface located in the path of the stud for actuating the said detent in the manner described is shown and broadly claimed in said prior patent, No. 383,041, hereinbefore referred to.

The locking-detent J is moved or shifted automatically into a position for the engagement of the notch $j'$ with the arm $I^2$ of the detent I by contact of said arm $I^2$ with an arm or projection upon said detent J. As herein shown, the detent J is provided with an arm $J^2$, upon which acts a tripping device for actuating the locking-detent, and said arm $I^2$ is provided with a projection or spur $i^3$, which is arranged to engage said arm $J^2$ in such manner as to swing the said locking-detent about its pivot and thereby bring the notch $j'$ into engagement with the said arm $I^2$, when the detent I is moved by the action of the stud E', in the manner hereinbefore described.

Figure 2:
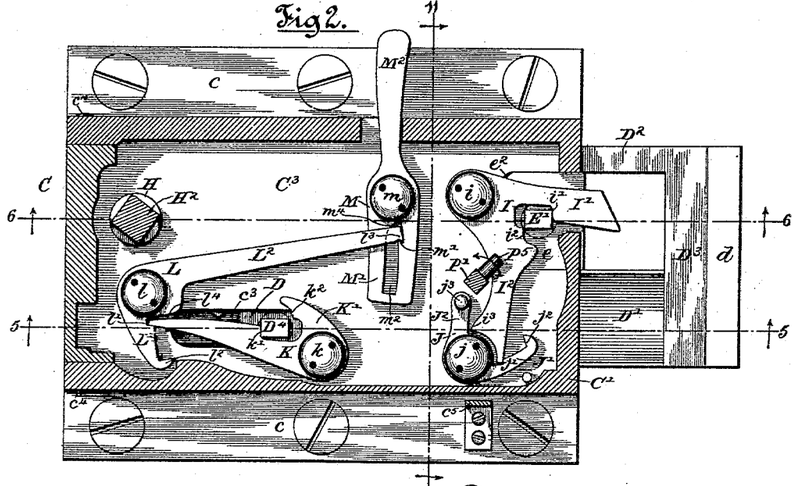
Fig. 2 is a sectional elevation taken upon line 2 2 of Fig. 6, showing the main part or case of the bolt-actuating mechanism and the levers thereon.

The interlocking surfaces of the locking-detent J and detent $I^2$ are so shaped that the parts will remain in engagement under the outward pressure of the stud E' upon the detent I, so that when the parts are interlocked and in the position shown in the drawings, Fig. 2, they will remain in this position until released by force applied to the locking-detent to move the same. It will be clear from the construction described that the sliding plate E is automatically locked or held in its retracted position when thrown backwardly or inwardly without the use of any springs for moving or actuating either the main detent I or the locking-detent J.

Devices are herein shown adapted to act upon the detent J for releasing the bolts in locking the safe, as will be hereinafter fully described.

For holding the sliding plate D at the forward limit of its movement so as to retain the casting and retracting-springs in their compressed condition during the compression of said springs by the action of the shaft H and after the said springs have been compressed, devices are herein provided as follows:

$D^4$ is a rigid stud affixed to the sliding plate D and extending outwardly through a longitudinal slot or opening $c^3$ formed in the front or outer wall $C^3$ of the case C.

K is a detent-lever which is pivoted upon a stud $k$ on the wall $C^3$ of the case and is provided with a notch or shoulder $k'$ between its pivotal point and its free end, said notch being located in position to engage the stud $D^4$ when the sliding plate D is at the forward or outward limit of its movement. The engaging-surfaces of the notch $k'$ and the stud $D^4$ are slightly beveled or inclined in such manner that the pressure of the stud tends to release the detent-lever therefrom. The said detent-lever K is provided with an arm or projection K, having upon it a cam-surface $k^2$, which is located in the path of the stud $D^4$ at the time said lever K is unlocked or disengaged from the said stud, and is so shaped that the action of the stud thereon, as the sliding plate D is thrust outwardly or forwardly, will throw the detent-lever K toward the stud and thereby bring the shoulder $k'$ in the path of the stud and hold the same from backward movement.

L is a second detent-lever, which is pivoted upon a stud $l$ affixed in the wall $C^3$ of the case. Said detent-lever L is provided with an arm L' having a notch $l'$, which is adapted to engage the end of the detent-lever K, when the latter is engaged with the stud $D^4$, and to thereby hold the detent-lever in engagement with the stud and retain the springs compressed. Said arm L' is preferably extended somewhat beyond the notch $l'$ and provided with a lug or projection $l^2$ for limiting the outward movement of the detent-lever K. Said detent-lever L is also provided with a second arm, $L^2$, adapted to engage a locking-detent M, which is immediately acted upon by the time mechanism. Said locking-detent M is pivoted upon a stud $m$ and is provided with a sliding arm M', in the slot of which is located the bent end $l^3$ of the lever-arm $L^2$. Said locking-lever M is provided, adjacent to its pivotal point, with a notch $m'$ adapted to engage the part $l^3$ of the arm $L^2$, when the detent-lever L is in position for engagement of the lever K with the notch $l'$.

The detent-lever M is herein shown as provided with an upwardly-extending arm $M^3$ adapted for engagement with the movable arm $n$, Fig. 1, of a time mechanism, which is indicated as a whole by N. Said time mechanism operates to move the said locking-detent M at a predetermined time, and thus releases the safe-detents described and the retracting-springs for opening the safe. In order that the detent-lever L may be automatically thrown into position to engage the detent-lever K at the time of compressing the springs, said detent-lever L is provided with a projecting part or surface $l^4$, arranged approximately at right angles with the arm L' and adapted to engage the end of the lever K, so that as the latter is swung in position for engagement of the notch $k'$ with the stud $D^4$ the free end of the said lever K will strike the projection or surface $l^4$ and thereby swing the detent L about its pivot until the notch $l'$ engages the end of the said lever K. The free end of the arm $L^2$ of said lever L in this movement of the parts swings through the slot $m^2$ of the locking-detent M until it comes opposite the shoulder $m'$ of said locking-detent.

In said prior patent, No. 383,041, are shown and described detent-levers which are constructed and operating in the same manner as the detent-levers K and L, herein shown. A similar locking-detent for actuation by the time mechanism, illustrated in said patent, is, however, actuated by means of a spring to cause its engagement with the detent-lever. In the present construction any such spring for actuating the locking-detent is dispensed with and said locking-detent is actuated automatically by movement of the lever-arm $L^3$ by means as follows: At the upper or inner end of the slot $m^2$ is formed a cam-surface $m^4$ arranged in the path of the part $l^3$ of said lever-arm $L^2$, said cam-surface being so shaped as to swing or throw the locking-detent in a direction to carry the shoulder $m'$ thereof into engagement with the said part $l^3$. In this construction, therefore, not only are the detent-levers K and L, but also the locking detent M, actuated directly or positively by the power obtained in moving the sliding plate D for setting the lock without reliance upon the use of springs to accomplish the interlocking of any of said parts.

Figure 4:
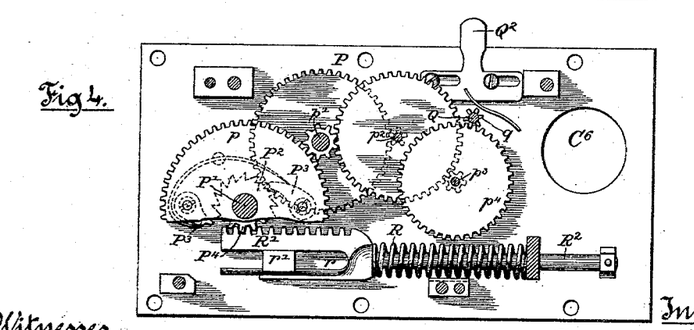
Fig. 4 is a sectional view of the motor and case shown in Fig. 3, taken upon line 4 4 of Figs. 5 and 6.
Figure 5:
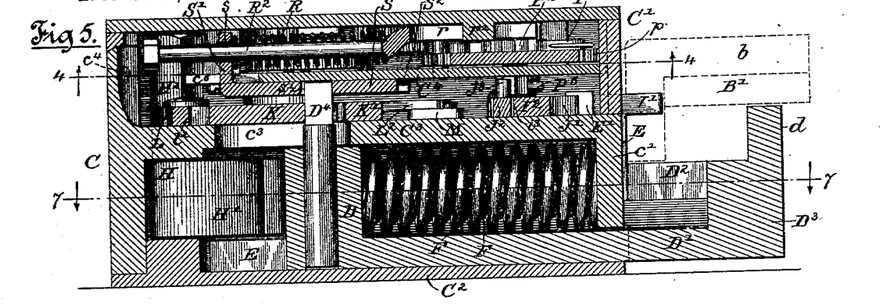
Fig. 5 is a horizontal section of the bolt-actuating device, taken upon line 5 5 of Fig. 2.

In said prior patent, No. 383,041, and also in another patent, No. 383,040, I have shown and described a spring-motor applied to actuate the locking-detent which holds the casting-springs from moving the bolts, in which the actuating-spring of the motor is wound or compressed by the same act by which the actuating-springs for the bolts are compressed or wound. A similar spring-motor is herein shown, but the one herein illustrated embodies certain features of novelty which are claimed as part of this invention. The motor for actuating the locking-detent is in this instance mounted in the shell or casing $C'$, hereinbefore mentioned, which is located over or against the inner face or wall $C^3$ of the main case C. For convenience in obtaining access to the several parts located upon the said case C, in the manner above described, the case $C'$ is pivotally connected with the case C at one end by means of pivots $c^4$ $c^4$, Figs. 2, 5 and 6, a suitable spring-catch $c^5$ being employed to hold the opposite or free end of the case $C'$ against the case C. The said case $C'$ thus forms, in one sense, a hinged cover for the protection of the several detent-levers on the case C, but said case $C'$ at the same time contains the motor by which the bolts are released for locking the safe. The main operative parts of said motor are more clearly shown in Figs. 3, 4, 5 and 6, and are made as follows:

P, Figs. 4, 5 and 6, indicates a train of gears which may consist of any desired manner of wheels and pinions arranged to intermesh in the usual manner.

$P'$ is the main or driving shaft of the train upon which is mounted a main or driving wheel $p$. Said driving-wheel is connected with the shaft by a backing-ratchet $P^2$ arranged to engage spring-pawls $P^3$ upon the main wheel $p$.

$p'$ $p^2$ $p^3$ are intermediate arbors or shafts of the train of gears, and Q is a shaft provided with a pinion $q$, which is driven from the gear-wheel $p^4$ of the most rapidly-driven arbor $p^3$. Said shaft Q is provided with some suitable speed-regulating device. As herein shown, said shaft extends through the inner wall $C^4$ of the case $C'$ into an annular box or chamber $Q'$, Fig. 3, within which is placed friction-weights carried by spring-arms upon the shaft, in the manner fully illustrated and described in said prior patent, No. 383,040.

The prime-mover employed in the instance illustrated for actuating the train of gears is a coiled spring R arranged to act by expansion upon a sliding rack $R'$ which intermeshes with a pinion $P^4$ affixed to the main shaft $P'$ of the train. The rack $R'$ is conveniently held in position and guided by means of a longitudinal slot $r$ therein, engaging a stud $r'$ upon the outer wall of the case $C'$. The spring R is conveniently placed around a rod or plunger $R^2$, which is attached at one end to the rack-bar $R'$. Said rod $R^2$ slides at its outer end in a guide-aperture $s$ formed in an outwardly-bent arm $S'$ of a sliding plate S which is located upon the inner face of the said wall $C^4$, the arm $S'$ passing through a slot $c^6$ in said wall in the manner illustrated, Figs. 3 and 5. Said sliding plate S is held in guides $S^2 S^2$ affixed to the said plate $C^4$, Fig. 3. The spring R is located between the said arm $S'$ and the end of the rack-bar $R'$, and acts by its expansion to move said rack-bar in a direction away from said arm $S'$. The said plate S is provided with an aperture $s'$ adapted to fit over and engage the stud $D^4$ on the sliding plate D, which is actuated by the retracting-springs G.

When the several bolt-actuating springs are expanded, the plate D is at the rearward or inward limit of its movement and the spring R is also expanded and the rack-bar $R'$ is at the rearward limit of its movement, the plate S will stand in position to engage the said stud $D^4$, and, supposing the case $C'$ at this time to be swung open or away from the case C, if said case $C'$ is closed against the said case C the said stud $D^4$ will enter and become engaged with the aperture $s'$ of said plate S. If when the parts are in this position the plate D is thrown forward to compress the bolt-actuating springs the plate S will be carried forward therewith, thereby compressing the motor-spring R between the arm $S'$ and the end of the rack. The plunger and rack of course remain stationary in this movement of the arm $S'$, which latter slides over the said plunger. After the spring R has been compressed in the manner described said spring will obviously tend to carry forward the rack $R'$, but said rack being in mesh with the driving-pinion of the gear-train will be prevented from moving forward at a speed greater than will be allowed by the turning of the train of gears and the regulating device thereof. It follows that the said spring R will expand slowly after the plate D has been moved forward, and that the main shaft $p'$, which is actuated by the rack-bar, will be slowly rotated by the action of the spring during a considerable period of time and until the rack has reached the forward limit of its movement.

The motor, constructed and arranged in the manner described, is arranged to operate upon the locking-detent J by means of devices as follows: In the outer end of the arm $J^2$ of said locking-detent is located a pin or stud $j^3$, which extends outwardly from said arm or in a direction toward the adjacent face of the inner wall $C^4$ of the motor-case, as clearly shown in Fig. 5. The main shaft $p'$ of the motor-train is extended through the said plate $C^4$ so as to come within the space between said plate $C^4$ and the adjacent plate $C^3$ of the main case C, and is provided on its projecting end with a crank-arm $P^5$ arranged in position to engage with the stud $j^3$ when the shaft $p'$ is revolved. Said shaft is turned in such direction that the crank-arm $p^5$ will act against the stud $j^3$ in a manner to swing the arm $j'$ of the locking-detent outwardly or away from the arm $I^2$ of the detent I, and thereby release the latter. The parts are so arranged that the shaft $p'$ will make only a part of a revolution during the expansion of the motor-spring, and the crank-arm $p^5$ will stand at a considerable angular distance from the stud $j^3$ after the spring is compressed, so that the crank-arm will not engage the stud until the motor-spring has reached the limit of its expansion, or nearly so. The crank-arm may be arranged to turn through a greater or less distance before it strikes the said stud, in accordance with the time which it is desired should elapse between the compressing of the main springs and the casting of the bolts, sufficient time being allowed in any instance to enable the safe-door to be fully closed and placed in position for the casting of the bolts before the said crank-arm strikes the stud and thereby releases the casting-springs.

One important advantage gained by the features of construction described, wherein the locking-motor is located in a separate case attached to the inner face of the main case of the bolt-actuating device, is that the parts of the lock are thereby brought in a more compact form and into a form to occupy a small space on the face of the door, so that the automatic device may be applied to small doors in which a greater part of the surface of the door is occupied by the bolts and carrier-bars.

Figure 3:
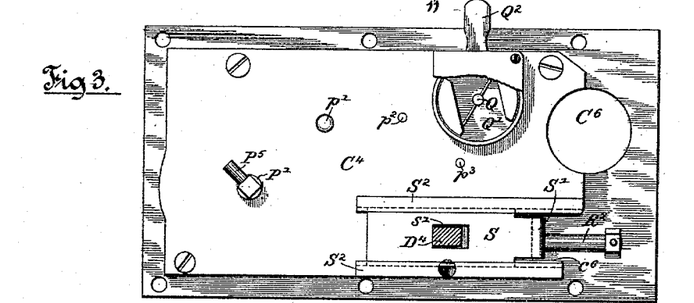
Fig. 3 is an inside face view of the separate casing which is hinged to the main casing and contains the motor for automatically releasing the casting-springs by which the door is locked.

The squared end $H^2$ of the actuating-shaft H is preferably terminated inside of the outer wall of the case $C'$, and the latter is provided with an aperture $C^6$, Figs. 3 and 6, through which the wrench or other implement may be inserted to engage with the squared end of the shaft.

For holding the train of gears temporarily from movement, in case the door is not immediately closed after the springs are compressed, a detent or locking device is preferably arranged to act on one of the moving parts of the train of gears. Such locking device, as herein shown, consists of a sliding plate $Q^2$ provided with a spring-arm adapted to bear on the pinion $q$, to hold the same from turning when the plate is shifted to bring the said arm into contact with said pinion.

The operation of the bolt-actuating devices constructed as above described is generally the same as that set forth in said prior patents hereinbefore referred to. When the safe-door is opened after the retraction of the bolts, the sliding plate D will stand at the inward limit of its movement and the sliding plate E will be similarly located, while the stud $E'$ on the plate E will be engaged with the detent I. The carrier-bar at such time will be retracted and the plate $b$ will stand adjacent to the lock-case and in contact with the end of the plate E, and will at the same time be engaged with the plate D. When setting the device for operation, prior to closing the door, the shaft H will be actuated to throw forward the plate D, thereby compressing both sets of springs, the plate E being held from movement by the detent I. When the plate D has reached the forward limit of its movement the stud $D^4$ thereof engages with the detent-lever K and the latter is locked so as to hold the plate D from backward or inward movement under the action of the springs F. The flange $d$ of said plate D is, in the advance movement of said plate, carried away from the plate $b$ of the carrier-bar. When the main springs are compressed the spring of the locking-motor is also compressed, in the manner hereinbefore described. As soon as the parts are set in the manner above stated the locking-motor begins to turn unless held out of action by the detent $Q^2$. If said detent is not used the door is immediately closed after the springs are compressed, and shortly thereafter the locking-detent J is tripped by the crank-arm $P^5$ of the locking-motor. The plate E is released and, acting upon the plate $b$ and carrier-bar, casts the bolts, said plate $b$ being carried forward into contact with the inner face of the flange $d$ of the plate D. At the expiration of the time for which the time-lock is set to open the safe, said time-lock trips the locking-detent M, releases the plate D and thereby allows the springs F to expand, forcing backwardly the plate D and carrier-bar, and the door is then unlocked.

Figure 12:
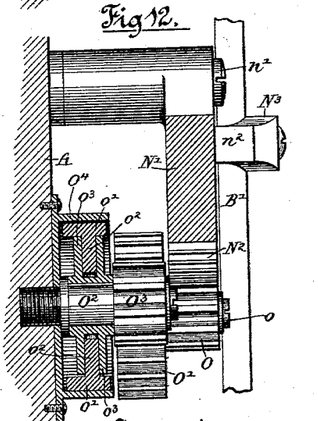
Fig. 12 a detail section of the retarding devices, taken upon line 12 12 of Fig. 1.

In Figs. 1 and 12 I have shown a novel form of retarding device for controlling the movement of the bolts under the action of the bolt-actuating devices, the object of such retarding device being to prevent any shock or blow upon the parts of the door when said bolts reach the limit of their movement after being forcibly cast or retracted by the springs.

As shown in the drawings, Figs. 1 and 12, $N'$ is a segmental plate mounted upon the inner face of the door by a pivot-stud $n'$. Said segmental plate is provided with gear-teeth $N^2$ at its free margin.

$N^3$ is a rod or bar attached to the carrier-bar B' and provided with an inwardly-projecting stud or pin $n^2$, which enters a slot or opening $n^3$ in the plate N'.

O is a pinion mounted upon a stud $o$ attached to the inner face of the door and intermeshing with the gear-segment $N^2$. Attached to said gear-pinion O is a gear-wheel O'.

$O^2$ is a short rotating shaft mounted on the face of the door parallel with the stud $o$, and provided with a pinion $O^3$, which intermeshes with the gear-wheel O'. Said shaft $O^2$ is located concentrically within a stationary ring or hollow cylinder $O^4$, and mounted upon said shaft are radially-movable friction-weights $o'$ $o'$, adapted to engage by centrifugal action the inner surface of the ring $O^4$, said weights and ring thereby forming a regulating device to control the speed of rotation of the said shaft. In the particular construction herein illustrated the friction-weights $o'$ $o'$ are connected with the shaft by means of radial pins $o^2$ upon the weights, which enter and slide in tubular arms or projections $o^3$ upon the shaft. When the carrier-bar is moved the segmental plate N' is swung or oscillated about its pivot, thereby rotating the pinion O and gear-wheel O' and giving rapid rotary movement to the shaft $O^2$, the speed of which is limited or controlled by the regulating device. The rapidity of movement in the carrier-bar and bolts will therefore be limited or controlled in accordance with the speed at which the segmental plate N' is allowed to move by said regulating device, and a means is thus provided for giving a slow and gradual movement to the carrier-bar and bolts both when cast and retracted, so that the latter will move easily and slowly and be stopped without shock or jar.

In Figs. 1, 8, 9 and 10 I have shown a novel safety unlocking device adapted for actuating the locking-detent which holds the retracting-springs from movement, and which may be employed in case the time mechanism should be injured or fail from any cause to perform its duty. Said unlocking device is operated by the movement of a heavy body within the safe, which body is set in motion by power applied without the safe, as by a bodily movement of the safe itself, and which either acts by its own impetus to give power to accomplish the unlocking of the safe or acts to release or put in motion a driving or other motor to accomplish the same result. In the figures above referred to this movable body has the form of a loose roller adapted to operate by impact when the safe is tilted or rocked. A pendulum or movable body otherwise sustained or supported may, however, be employed to produce the same general result. It will of course be obvious, however, that an unlocking device of this latter kind can only be applied to safes which can be bodily moved or tilted, and are inapplicable to safe-vaults and similar structures.

As illustrated in the figures of the drawings referred to, T is a shell or casing secured to the inner face of the safe-door at a point somewhat above and adjacent to the case C of the bolt-actuating device. T' is a tube attached to said case T and extending outwardly from one side of the same in a horizontal position. For economy of space the said tube T' is herein shown as located between the top of the bolt-actuating device and the time-lock, in the manner shown in Fig. 1. Said tube T' is closed at its outer end, and within the tube is located a ball or roller $t$, preferably of metal or some other hard and heavy substance.

U is a swinging arm mounted upon a horizontal shaft $u$ within the case T and adapted to oscillate about the shaft. The lower or free end of said arm U is located opposite the open end of the tube T' and is preferably provided with a lug or projection $u'$, which enters the tube when the arm is swung forward or toward the same. Affixed upon said shaft $u$ is a ratchet-wheel U', which is engaged by a pawl $u^2$ mounted on the arm U. The pawl is so arranged that when the arm is thrown backwardly away from the tube it will engage and turn the ratchet-wheel. The said arm U is held normally in position adjacent to the tube by a suitably applied spring and is thrown backwardly against the action of the spring by the impact of the ball $t$ upon its end opposite the tube when the safe is tilted so as to incline the tube and cause the ball to gravitate against said arm. The spring for actuating the arm U may be arranged in any convenient manner. As herein shown, a sliding plunger $U^2$ is mounted in a cylinder or barrel $T^2$ upon the case T in position to act at its end against the arm U. Said plunger is actuated by a spiral spring $T^3$ located within said barrel and acting upon a shoulder of the plunger.

It will be clear from the construction described that each time the safe is tilted or rocked to carry the ball endwise of the tube and into contact with the arm U said arm will be thrown backwardly and will, by its engagement with the ratchet-wheel U', give a partial rotation to the shaft $u$. Said shaft $u$ is provided with a worm $u^3$, which engages a worm-wheel V mounted on a transversely-arranged shaft $v$ also having bearings in the case T, and said shaft $v$ is provided with a worm $v'$, which intermeshes with a worm-wheel W on a shaft $w$ arranged at right angles to the shaft $v$. Said shaft $w$ extends at one end through the outer or front face of the case T and is provided outside of the case with an arm W', which turns with the shaft and is provided with a pin or stud $w'$.

X is a longitudinally-sliding bar mounted in guides $T^4$ $T^5$ upon the case T. Said bar is extended at one end to a point adjacent to the arm $M^2$ of the locking-detent M and is provided with a transversely-bent part $x$ adapted to engage the said arm $M^2$, said bent part $x$ being arranged at the same side of the locking-lever at which the actuating-arm of the time-lock is located. The said bar X is further provided with a shoulder $x'$ located in position to be encountered by the stud $w_1$ when the arm W' is revolved.

It follows from the construction that when the arm U is actuated by contact of the ball $t$ therewith the shaft $w$ will be revolved, but very slowly, owing to the employment of the several worms and worm-wheels by which motion is transmitted from the shaft $u$ to the shaft $w$, so that it will require a great many movements of the said arm U to complete a single revolution of the shaft $w$. In case the time-lock fails to operate from any cause, if the safe is tilted or rocked continuously for a long period of time repeated impacts or blows of the ball against the swinging arm U will finally turn the shaft $w$ a sufficient distance to bring the pin $w'$ against the shoulder $x'$ and thereby shift the bar X endwise so as to trip the locking-detent and allow the operation of the retracting-springs and the unlocking of the safe.

I have shown two worm-shafts and worm-wheels as interposed between the shaft $u$ and the shaft $w$; but it will of course be understood that any number of such worms and worm-wheels may be employed as is found necessary or desirable, depending upon the time in which it is desired that the rocking of the safe shall be continued before the safety device comes into operation for unlocking the safe. The time will in all cases be so great as to prevent possibility of the safe being opened in this manner by unauthorized persons—as, for instance, the time should be greater than that during which a burglar might operate without detection in the place in which the safe or vault is located.

In order to enable the time required for opening the safe by the safety device to be changed, the pin $w'$ instead of being rigidly connected with the shaft $w$ is made capable of angular adjustment upon said shaft by devices constructed as follows: Rigidly attached to said shaft $w$ outside of the case T is a disk $W^2$ provided with peripheral ratchet-teeth $w^2$. The arm W', carrying the stud $w'$, is mounted to turn upon the said shaft $w$ and is provided with a spring-pawl $w^3$, adapted to engage the ratchet-teeth $w^2$. The face of the said disk $w^2$ is, furthermore, desirably marked with a scale or index in the manner illustrated. Said scale or index may be conveniently marked to indicate the number of movements of the safe required to turn the same through a certain angular distance. The ratchet-teeth of the said disk $W^2$ are so arranged that the arm W' will be engaged and carried forward with the disk as the shaft $w$ is revolved, said arm W' being free to turn forwardly with reference to the disk, so that it may be set at any desired position or angle and may be placed at any point of the scale desired, according to the length of time necessary for safety.

The bar X may be arranged to simply slide in the bearings $T^4$ $T^5$; but in order to prevent said bar from being accidentally shifted it is herein shown as made as follows: At its end which engages the bearing $T^5$ said bar is provided with a shoulder $x^2$, which is engaged with said bearing in the normal position of the bar, while a spring-arm X', attached to the bar and engaged with a guide-aperture of the said bearing $T^5$, holds the said bar upwardly in position for engagement of said shoulder with the said bearing. The top surface of the bar adjacent to the shoulder $x'$ is so arranged, furthermore, that when the stud $w'$ encounters the bar it will force the latter downwardly a sufficient distance to free the shoulder $x^2$ from the bearing $T^5$ before the bar is moved endwise by the action of said pin upon the shoulder, the opening in said bearing $T^5$ being sufficiently large to allow the bar to pass or slide through the same when depressed by the pin, in the manner described.

Figure 13:
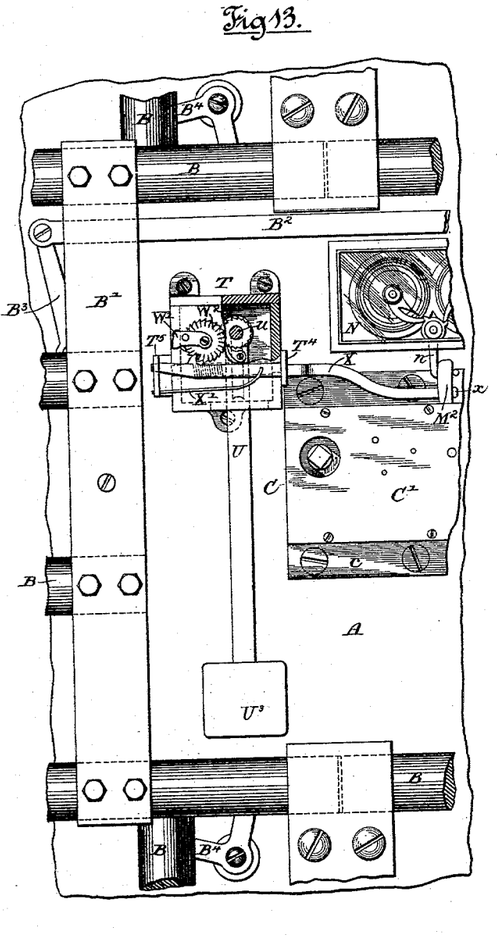
Fig. 13 illustrates a modified form of the safety unlocking device.

In Fig. 13 I have shown another form of safety unlocking device wherein a pendulum is used instead of a roller as a means of actuating the unlocking device. In this instance all the parts of the device are made as hereinbefore described, excepting that the arm U is extended downwardly through the bottom of the case and is provided at its lower end with a pendulum-weight $U^3$, which is located within a convenient space at the lower part of the door. When the safe containing this form of the device is rocked or tipped the arm U will obviously turn or oscillate about the shaft $u$, thereby actuating said shaft through the medium of the ratchet and giving motion to the revolving pin by which the trip-bar X is actuated, in the same manner as hereinbefore described.

The employment of a safety unlocking device which is operated by the bodily movement of a weight within the safe, in the manner described, is of great advantage inasmuch as it affords a cheap and simple way of unlocking the safe in case of accident to the time-lock.

In the use of a device of the character illustrated in Figs. 8, 9, 10 and 13 the safe if of ordinary size may obviously be placed upon supports or skids in such manner that it may be easily rocked or tilted, so that by the employment of one or two men for a day or thereabouts in rocking or tilting the safe thus supported the safe may be opened, while in the case of a safe without such safety unlocking device it might become necessary to practically destroy the entire safe in order to obtain access to its contents.

I claim as my invention—

1. The combination with the bolts of a safe, and a spring for actuating the bolts, of a plate moved by the spring and actuating upon the bolts, a pivoted detent-lever K, constructed to hold said plate from movement, a second detent-lever L engaging the lever K, and a locking detent M, provided with a notch or shoulder engaging said detent-lever L, and provided also with a cam-surface located in position to be encountered by the lever L and to thereby cause the locking-detent to move into position for the engagement of the notch or shoulder thereof with the said lever L, substantially as described.

2. The combination with the bolts of a safe, and a casting spring for the bolts, of a shell or case C inclosing said casting spring, a detent mounted on the case for holding the casting spring from moving the bolts, a locking motor for actuating said detent, and a second shell or case, containing said locking motor, and adapted to cover the front face of said case C when the parts are in operative position, substantially as described.

3. The combination with the bolts of a safe and a casting spring for the bolts, of a shell or case C inclosing the casting spring, a detent on the case for holding the spring from moving the bolts, a motor for actuating said detent, comprising a train of gears and a spring for actuating the same and a case containing the said motor located in front, of the case C and covering to the front face of said case C and the said detent, one of the moving parts of said motor being adapted to engage and actuate the said detent for releasing the casting springs, substantially as described.

4. The combination with the bolts of a safe and a casting spring for the bolts, of a shell or case C inclosing the casting spring, a sliding plate D which is moved in compressing the said spring, a detent holding said spring from casting the bolts, a motor for actuating said detent, comprising a train of gears and a spring for actuating the same, a case C' for said motor located over the front face of the said case C, and a sliding plate S' upon said case C', arranged to act upon the motor spring for compressing the same, and adapted to engage the said sliding-plate D, substantially as described.

5. The combination with the bolts of a safe and a casting spring for the bolts, of a shell or case C inclosing the said spring, a sliding plate D, the movement of which compresses the said spring, said plate D being provided with a stud, a detent holding the casting spring from moving the bolts, a motor for actuating said detent, comprising an actuating spring and a train of gears, a case C containing said motor and a sliding plate S mounted on said case, and acting on the motor spring to compress the same, said plate being provided with an aperture to receive the stud $d^4$, substantially as described.

6. The combination with the bolts of a safe and a casting spring for the bolts, of a shell or case C inclosing said spring, a sliding plate D in said case, a detent holding the casting spring from movement, a motor for actuating said detent, comprising a train of gears, a rack bar intermeshing with a pinion on one of the shafts of the train, and a spiral spring acting on said rack-bar, a case C' containing said motor, and a sliding plate S mounted upon the case and acting upon the motor-spring, said plate S being adapted for engagement with the said plate D, substantially as described.

7. The combination with the bolts of a safe, and a casting spring for the bolts, of a shell or case C' inclosing said spring, a sliding plate D, the movement of which compresses the casting-spring, said plate D being provided with a stud $D^4$, a detent holding the casting spring from moving the bolts, a motor for actuating the said detent, comprising a train of gears, a rack-bar intermeshing with a pinion on one of the shafts of the train, and a spiral spring acting on the said rack-bar, a case C' containing said motor, and a sliding plate D mounted on the said case and acting on the motor-spring, said plate being provided with an aperture to receive the said stud $D^4$, substantially as described.

8. The combination with the bolts, casting-spring, case C, detent thereon, and plate D provided with a stud $D^4$, of a case C' and a motor for actuating the detent mounted in said case C', and comprising a train of gears, a rack-bar engaging a pinion upon one of the shafts of the train, said rack-bar being provided with a stem $R^2$, a spiral spring surrounding said stem and a sliding plate S mounted on the case and provided with an arm engaging said stem $R^2$ and acting on said spiral-spring, said plate S being provided with an aperture engaging the stud $D^4$, substantially as described.

9. The combination with the bolts of a safe, and casting and retracting springs for the bolts, of a shell or case C inclosing said springs, sliding plates D and E within said case, said plate D being provided with a stud $D^4$, a detent on the case engaging said stud $D^4$, a detent J holding said plate E from movement, a motor for actuating said detent, comprising an actuating spring and a train of gears, a case C' containing said motor, and a sliding plate S, mounted on said case C' and acting on the motor spring, said plate S being provided with an aperture to receive the stud $D^4$, substantially as described.

10. The combination with the bolts of a safe, and casting and retracting springs for the bolts, of a shell or case C, sliding plates D and E within said case, said plates being provided with studs $D^4$ and $E'$, a detent engaging said stud $D^4$, a detent I engaging the stud $E'$, a detent J engaging the detent I, a motor for actuating the said detent J comprising a train of gears and a spring for actuating the same, and a case containing said motor, one of the revolving parts of the motor being provided with an arm adapted to engage and actuate the detent J and a sliding plate S mounted on the case C' and acting on the motor spring to compress the same, said plate being provided with an aperture to engage the plate being provided with an aperture to engage the stud $D^4$, substantially as described.

11. The combination with the bolts of a safe, and actuating spring for the bolts, of a shell or case C inclosing said spring, a detent mounted on the case for holding the spring from moving the bolts, a sliding plate, which is moved in compressing said spring, provided with a stud extending outside of the front wall of the said case C, a motor case C' located over or against the front face of the case C and a motor located within said case C', and provided adjacent to the front of the case C, with a revolving arm adapted to engage and actuate the said detent on said case C, and with a sliding plate, the movement of which winds or compresses the motor-spring, and which is adapted to interlock with the said stud when the case C' is closed against the case C, substantially as described.

12. The combination with the bolts of a safe, and a spring for actuating the bolts, of a retarding device comprising an oscillating gear-segment connected and moving with the bolts, a train of gears engaged with said gear-segment, and a speed-regulating device applied to control the speed of rotation of the said train of gears, substantially as described.

13. The combination with the bolts of a portable safe, an automatic bolt actuating device and a time mechanism controlling the same, of a safety unlocking device, comprising a tripping and releasing mechanism having a rotating part or pin adapted to engage or release the bolt actuating device at one point in its path, and a heavy body or weight movably supported within the safe free from contact with the walls thereof, and which is free to shift its position when the safe is bodily moved, said heavy weight being adapted to act by its gravity upon the tripping or releasing mechanism to continuously actuate the same when repeatedly moved or shifted, substantially as described.

14. The combination with the bolts of a safe, an automatic bolt-actuating device, and a time-mechanism controlling the same, of a safety unlocking device comprising a tripping or releasing mechanism to trip or release the bolt actuating device, and a heavy body, or weight movably supported within the safe and constructed to operate or start the tripping or releasing mechanism when moved or shifted; said tripping or releasing mechanism being provided with a revolving pin or stud, and a tripping bar adapted to engage the bolt actuating device, and located in position for engagement with the said pin or stud, substantially as described.

15. The combination with the bolts of a safe, an automatic bolt actuating device, and a time-mechanism, of a safety unlocking device, comprising a heavy body or weight movably supported within the safe, an oscillating pivoted arm actuated by the movements of said weight or body, a ratchet-wheel, a pawl on the arm engaging the ratchet-wheel, gearing actuated by said ratchet wheel, and a tripping bar actuated by the said gearing, substantially as described.

16. The combination with the bolts of a safe, an automatic bolt-actuating device, and a time-mechanism, of a safety unlocking device, comprising a heavy body or weight having the form of a ball or roller, a way or track within the safe, supporting said ball or roller and gearing actuated by the impact of said ball or roller and adapted to act upon the bolt actuating device to trip the same and allow the retraction of the bolts, substantially as described.

17. The combination with the bolts of a safe, an automatic bolt-actuating device, and a time-mechanism, of a safety unlocking device, comprising a heavy body or weight having the form of a ball or roller, a way or track within the safe, supporting said ball or roller, an oscillating pivoted arm actuated by the impact of said ball or roller, a ratchet wheel, a pawl on the arm engaging the said ratchet wheel, gearing actuated by said ratchet-wheel, and a tripping-bar actuated by said gearing, substantially as described.

18. The combination with the bolts of a safe, an automatic bolt-actuating device, and a time-mechanism, of a safety unlocking device, comprising a heavy body or weight having the form of a ball or roller, a way or track within the safe, supporting said ball or roller, an oscillating pivoted arm having its free end adjacent to the end of the said track or way, a spring applied to throw the arm toward the track or way, a ratchet-wheel, a pawl moved by the oscillating arm and engaging said ratchet-wheel, gearing actuated by the said ratchet-wheel, and a tripping bar actuated by the said gearing, substantially as described.

19. The combination with the bolts of a safe, an automatic bolt-actuating device, and a time-mechanism, of a safety unlocking device, comprising a tripping or releasing device to trip or release the bolt actuating device and a heavy body or weight, movably supported within the safe, said tripping or releasing mechanism being provided with a rotating shaft, a disk affixed to the shaft and provided with peripheral ratchet teeth, an arm mounted on the shaft, and provided with a stud or pin, and with a pawl engaging the said ratchet teeth and a tripping-bar actuated by the said stud or pin, substantially as described.

20. The combination with the bolts of a safe, an automatic bolt-actuating device, and a time-mechanism, of a safety unlocking device, comprising a tripping or releasing device to trip or release the bolt-actuating device, and a heavy-body or weight, movably supported within the safe, said tripping or releasing mechanism being provided with a rotating shaft, a revolving stud or pin carried by the said shaft, a vertically and longitudinally movable tripping-bar, provided with a shoulder for engagement with the stud, and a second shoulder $X^2$ to engage one of the bearings of the bar, and a spring holding the bar in position for the engagement of the said shoulder $X^2$ with the bearing, the said stud being arranged to move the bar laterally to disengage said shoulder from the bearing before the bar is moved endwise by said stud, substantially as described.

21. The combination with the bolts of a safe, an automatic bolt actuating device, and a time mechanism, of a safety unlocking device comprising a frame or case, a tube adjacent thereto, an oscillating arm mounted in the frame or case, a ball or roller in the tube adapted to act upon the free end of the said arm, a ratchet-wheel mounted in the case, a pawl on the arm acting on the ratchet wheel, gearing actuated by said ratchet wheel, a revolving shaft actuated by the gearing and provided with a pin or stud located outside of the case, and a tripping bar adapted for actuation by the said stud, or pin, substantially as described.

In testimony that I claim the foregoing as my invention I affix my signature in presence of two witnesses.

AUGUSTUS G. BURTON.

Witnesses:
C. CLARENCE POOLE,
HARRY COBB KENNEDY.